Patented June 5, 1951

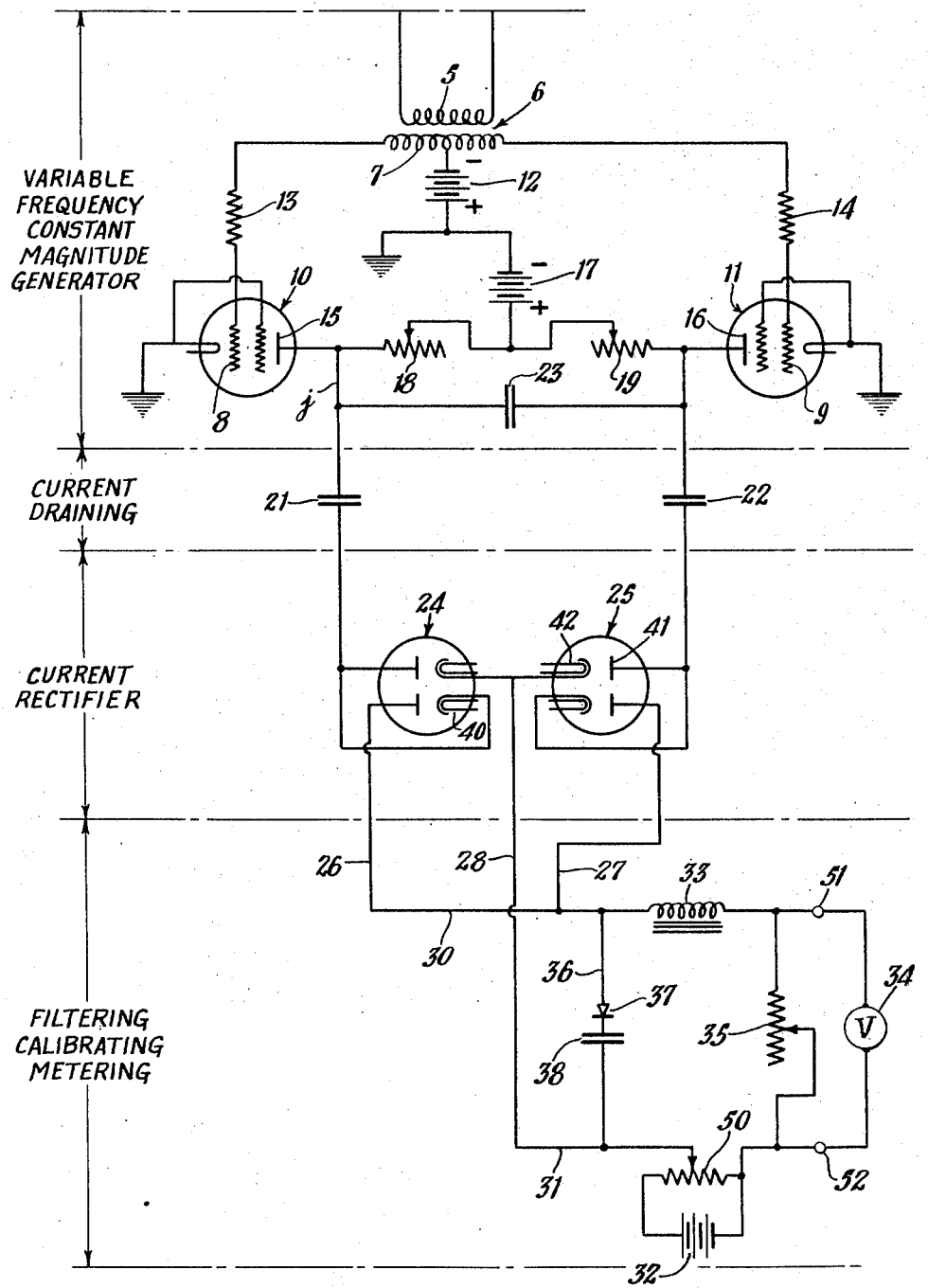

2,555,865

UNITED STATES PATENT OFFICE 2,555,865

IMPULSE FREQUENCY METERING SYSTEM

Mead Warren, Jr., Maryville, Tenn., assignor to Aluminum Company of America, Pittsburgh, Pa., a corporation of Pennsylvania Application December 12, 1945, Serial No. 634,582

2 Claims. (Cl. 175—368)

This invention relates to the measurement and indication of frequencies of electronic impulses.

The object of the invention is to provide a frequency metering system which will be speedily and accurately responsive to variations in the frequency impulses being measured.

Further objects of the invention particularly in providing a system adapted to receive impulses from a remote transmitter and produce a voltage proportional to the frequency of the impulses, which voltage in turn is used to operate a remote meter, will appear from the following specification taken in connection with the accompanying drawing showing a typical system embodying the invention.

The impulse circuit, the frequency of which is to be determined, is connected to the primary 5 of transformer 6. The current from the secondary 7 passes through fixed resistors 13, 14 to control grids 8 and 9 of two Thyratron tubes 10 and 11. A normal voltage, for instance of —7.5 volts, is impressed on the grids from the D. C. supply 12. The plates 15, 16 of the tubes 10, 11 are in circuit with the D. C. source 17 through resistors 18, 19 set to give a plate current of 20 mils, for instance, both tubes drawing approximately the same amount.

These circuits provide a variable frequency, constant magnitude generator comprising the gas filled tubes 10, 11 which are alternately fired by the alternations of the voltage supplied to the primary 5. The voltage produced in the plate circuit of these tubes has a constant magnitude because of the characteristic of the gas filled tube and because the plate voltage is from a well regulated source 17.

The generator circuits supply current to condensers 21, 22 with condenser 23 in shunt across the supply line; these condensers 21, 22 constituting a current drawing device are connected to the rectifier tubes 24, 25.

The tubes 24, 25 are divided rectifier tubes changing the alternating current to direct current for operating the D. C. meter, and the rectified current is delivered through leads 26, 27 and 28 to the filtering and metering circuit, smoothing the rectified direct current into a pure direct current measuring the frequency of the impulses at the input 5 of the transformer.

The metering circuit comprises conductors 30, 31 connected to the rectified supply at 26, 27, 28 and having an independent power supply of D. C. current at 32. A choke 33 is placed in series to block surges from the voltmeter 34, across the terminals of which is the variable resistance 35.

On the opposite side of the choke 33 is the shunt 36 comprising the copper oxide half-wave rectifier 37 and condenser 38 in series. The copper oxide half-wave rectifier is turned so as to make an easy path for electrons flowing into condenser 38 and to offer a high impedance to electrons flowing out of the condenser. This, in effect, rectifies any A. C. ripple or harmonics passing through the rectifier tubes 24, 25. The electrons stored in the condenser 38 drain slowly as a D. C. current through the copper oxide rectifier 37 and choke 33 to give a steady deflection on the meter 34.

The electronic impulses received at the primary 5 of transformer 6 are thus used to control the generation of an A. C. voltage. This voltage is used to produce a current which is rectified and then smoothed out in a filtering metering circuit to give the frequency reading on the meter 34. The operation of the generator circuits of the tubes 10, 11 uses the transformer secondary voltages to fire the tube circuits in alternation. At a given instant the control grid voltage of one tube is being driven in the positive sense, while the other is being driven in the negative sense from the normal no signal value. Suppose the gas discharge has previously been established in the tube whose grid is being driven more negative. When the grid of the other tube is made sufficiently positive, the gas discharge will be established in this tube. Establishing of the discharge causes the voltage on the plate of the tube to drop and a voltage to appear across the plate resistor. This voltage drop is reflected through condenser 23 to momentarily drive the plate voltage of the first tube to some negative value and this first tube goes out. On the reversal of the applied signal voltage, this process is repeated in the reverse sense. Thus a variable frequency, constant magnitude voltage is generated. It is the current produced by this voltage through condensers 21, 22 which is rectified, filtered and used to operate the D. C. meter 34.

This process can be traced in detail as follows: With reference to the drawing, suppose the gas discharge of the Thyratron tube marked 11 has previously been established. As the signal, applied at terminals 5 of the input transformer 6, begins to drive the grid 9 of this tube in the negative sense, it drives the grid 8 of the other Thyratron tube 10 in the positive sense. When the grid of this second tube is driven far enough in the positive sense (to about —1½ volts), the gas discharge is established and the electron flow can be traced as follows: Beginning at ground at the cathode of tube 10, through the tube to a three way junction *j* through resistance 18 to power supply 17, the voltage drop across resistance 18 produces a current in the metering circuit which may be traced as follows: Beginning at this junction *j*, electrons will flow down through condenser 21 (until it is charged) to cathode (terminal 40) of the diode 24, through the diode 24 into the filtering and metering circuit by conductors 26, 30. As soon as condenser 21 is charged, no more electrons can flow through the metering circuit 30, 31 regardless of how long the gas discharge is maintained. Therefore, the amount of current flowing in the metering circuit is obviously dependent on the number of discharges.

When the tube fires, the plate voltage drops from 150 volts to about 10 volts, or a sudden decrease of 140 volts, due to voltage drop in resistance 18. This sudden change in voltage is momentarily applied to the plate of the other Thyratron tube 11, through the condenser 23. Since tube 11 is "firing," its plate voltage is about 10 volts and consequently this 140 volt surge through condenser 23 lowers the plate voltage to a negative value and the tube 11 goes out. By this time the grid 9 has been driven sufficiently negative by the signal voltage so the tube remains out.

As soon as the tube 11 goes out, the IR drop across resistance 19 disappears and condenser 22 is permitted to discharge through resistance 19 and the upper half 41, 42 of the diode 25. This circuit in effect becomes the return path, from the metering circuit, of the charging current of condenser 21.

This process is repeated in the reverse sense during the other half of the signal voltage. It will be noted that the current through the meter 34 is always in the same direction due to rectifying action of the diodes 24, 25.

Effectively, the plate current of a single tube flows at all times, but one half of the time in one tube and the other half in the second tube. At each transition of the current from one tube to the other, occurring twice per cycle of the applied frequency, a pulse is sent through the diodes and metering circuits. If the voltage drops across the plate resistors 18, 19 of the gas tubes are constant, the pulses of current through the meter are constant in amplitude and in shape. The millivoltmeter 34 reads the average value of this pulsing current, and if the pulses are all alike, the reading is proportional to the number of pulses per second, or to the frequency.

If a D. C. voltmeter is connected in series with a condenser, the former will momentarily be deflected by a charging current of the condenser. If the condenser charge is reversed, another deflection will follow. The quantity of electricity passed per cycle (two reversals) will be:

$$Q = 2CE$$

and the average current will be:

$$I = \frac{Q}{t} = 2CEf$$

where

*f* = number of reversals per second
*Q* = electric charge in coulombs
*I* = current flow in amperes
*E* = voltage in volts
*C* = capacity in farads This is a simplified "electron bucket" and if these buckets of electrons are smoothed out a direct current will be obtained whose magnitude is proportional to the number of times that the bucket is filled and emptied.

In the present system the rectified impulses from the current drawing condensers 21, 22 are superposed on the meter circuit, the choke 33 blocks the surges from the meter 34 and turns them into the "storage tank" 36 provided by the copper oxide rectifier 37 and condenser 38. The half-wave rectifier 37 further aids in smoothing the pulses into pure direct current by rectifying any A. C. ripple or harmonic components present before they reach the meter 34.

If the current pulses are to be alike, the following factors must be held constant:
1. Plate supply voltage for the Thyratron tubes 10, 11.
2. Resistance of diodes 24, 25 and meter circuit 30, 31.

Regulation of the plate supply voltage is provided by gas filled voltage regulator tubes and by static voltage regulating transformers in the A. C. power supply.

The filament temperature of the diodes 24, 25 effectively varies the resistance of the tube, but in this circuit the filament temperature is held fixed by supplying the filament current from the static voltage regulating transformer.

It is desired that the readings of the instrument shall not vary with the magnitude of the applied signal voltage. This is possible only if, first, the applied voltage is sufficiently large to result in accurate firing of the gas tubes, and, second, that the cathode-plate drop of the gas tubes is independent of grid bias of the tube. The voltage required at the terminals of the primary winding 5 should be not less than five volts for reliable firing. Present day gas filled tubes are so designed that there is noticeable effect of grid bias on the cathode-plate drop.

The gas filled tubes 10 and 11 have been referred to as Thyratrons because this has become the commonly accepted term for grid controlled, gas filled tubes. The tubes 24, 25 are diode rectifiers in the typical system shown, and in this system resistors 18, 19 are 10,000 ohm, 10 watt, semi-variable, and are adjusted to give a plate current of 20 mils. Resistors 13, 14 are 20,000 ohm, 1 watt, and resistor 35 for volume control is an adjustable shunt for meter 34 and is determined by characteristics of the meter. It is used as follows: A signal of known frequency is applied and the resistance 35 is adjusted until the meter reads correctly. Before this is done, however, the system should be freed of variations superposed by ionization noise in the Thyratron tubes 10, 11 which, rectified in the diode tubes, passes through the meter even with no applied signal, and so may give a false indication. This voltage is balanced out by adjustment of resistance 50 of the regulated D. C. current supply 32. Resistance 35 is opened and a microammeter is placed on the output terminals 51, 52, after which resistance 50 is adjusted until the ammeter reading is just decreased to zero and no more. During this setting, it is essential that one of the triode tubes 10, 11 is firing.

For a typical arrangement having a range up to about 30 impulses per second, condensers 21, 22 are 0.25 mfd., 600 volt; the condenser 23 is 0.01 mfd., 600 volt; and the condenser 38 is 32.0 mfd., 600 volt. The choke 33 is 30 henrys. Much higher frequency ranges, up to 10,000 impulses, can be obtained by proper selection of above components.

This system is advantageous in having no moving parts and being adapted to a large range of frequencies. It provides an immediate and accurate response of the meter indication to changes in frequency, including sudden wide surges. The system has extremely high stability and its accuracy is independent of circuit resistance changes over a wide range. The output circuit, the input circuit and the power supply circuit are electrically separate, permitting the power supply to be properly grounded and insure stable operation of the generator. The output circuit may be connected to other output circuits to obtain totalized or differential readings, and the system prevents high voltages of the power supply from reaching the meter and causing errors from electrostatic deflection.

This system is typically effective in connection with the control of power from a distant supply, as by electronic telemetering equipment metering the load on a branch line on one point and transmitting the reading with telemetering equipment to a remote meter located at the powerhouse, the purpose being to readjust the power generation to compensate for the load change. The effectiveness of any such control system is dependent upon speed and accuracy of the telemetering. If a time delay is introduced, the corrective attitude may aggravate rather than correct the load swings. Likewise, any inaccuracy of the remote metering will upset the load schedules. With the frequency-receiving system of this invention, the changes in frequency are continuously and accurately measured and produce D. C. voltage accurately proportional to the rate (frequency) of the impulses, and the power control is kept continuously and accurately linked to the load changes.

While the invention has been described and illustrated in connection with typical circuits, it is not confined thereto and it is intended to cover such variations thereof as come within the scope of the appended claims.

What I claim is:

1. A system for receiving electrical impulses and measuring the frequency thereof comprising a variable frequency constant magnitude generator circuit including a pair of alternately firing grid-controlled gas tubes with cathode-plate circuits actuated by said impulses, the grid-control circuit of said tubes comprising an input transformer, a pair of fixed resistors and a D. C. power supply, each of said fixed resistors being connected to opposite ends of the secondary coil of said transformer and to the grid of one of said gas tubes, and the said D. C. power supply being tapped to the midpoint of said secondary coil and connected to the cathodes of said tubes; the plate circuit of said tubes comprising a pair of variable resistors, a condenser in parallel with said resistors, and a D. C. power supply, each of said variable resistors being connected to the plate of one of said gas tubes and to each other, the power supply being connected to the midpoint between said resistors and to the cathodes of said tubes, and the condenser in parallel with said variable resistors, the opposite sides of said condenser also being directly connected to the plates of said tubes; a pair of condensers each of which has one side thereof connected to the plate of but one of said tubes whereby the current flow through said tubes charges each of said condensers alternately; a bridge type rectifier connected to the other side of each of said condensers, said rectifier rectifying all the current of said condensers, and an output translating circuit comprising a first circuit connected across the output of said bridge type rectifier, said first circuit comprising a half-wave rectifier in series relation with a storage condenser for averaging the flow of pulses through said bridge, and a second circuit connected in parallel relation to said first circuit, said second circuit comprising in series relation a choke coil and a current responsive device, and an adjustable source of D. C. potential for biasing the current flow in said output circuit.

2. A system for receiving electrical impulses and measuring the frequency thereof comprising a variable frequency constant magnitude generator circuit including a pair of alternately firing grid-controlled gas tubes with cathode-plate circuits actuated by said impulses, the grid-control circuit of said tubes comprising an input transformer, a pair of fixed resistors and a D. C. power supply, each of said fixed resistors being connected to opposite ends of the secondary coil of said transformer and to the grid of one of said gas tubes, and the said D. C. power supply being tapped to the midpoint of said secondary coil and connected to the cathodes of said tubes; the plate circuit of said tubes comprising a pair of variable resistors, a condenser in parallel with said resistors and a D. C. power supply, each of said variable resistors being connected to the plate of one of said gas tubes and to each other, the power supply being connected to the midpoint between said resistors and to the cathodes of said tubes and the condenser in parallel with said variable resistors, the opposite sides of said condenser also being directly connected to the plates of said tubes; a pair of condensers each of which has one side thereof connected to the plate of but one of said tubes whereby the current flow through said tubes charges each of said condensers alternately; a bridge type rectifier comprising a pair of double diode tubes connected across the input and output terminals of said condensers, said rectifier rectifying all the current of said condensers, and an output translating circuit comprising a first circuit connected across the output of said bridge type rectifier, said first circuit comprising a half-wave rectifier in series relation with a storage condenser for averaging the flow of pulses through said bridge, and a second circuit connected in parallel relation to said first circuit, said second circuit comprising in series relation a choke coil and a current responsive device, and an adjustable source of D. C. potential for biasing the current flow in said output circuit.

MEAD WARREN, JR.

REFERENCES CITED

The following references are of record in the file of this patent:

UNITED STATES PATENTS

| Number | Name | Date |
|---|---|---|
| 2,026,421 | Fecker | Dec. 31, 1935 |
| 2,113,011 | White | Apr. 5, 1938 |
| 2,119,389 | Hunt | May 31, 1938 |
| 2,232,858 | Lane | Feb. 25, 1941 |
| 2,435,210 | Fahrner | Feb. 3, 1948 |

OTHER REFERENCES

"Review of Scientific Instruments," Dec. 1936, article by Gingrich et al. at pages 450–456.